United States Patent [19]

Aseltine et al.

[11] Patent Number: 4,834,913

[45] Date of Patent: May 30, 1989

[54] APPARATUS AND METHOD FOR FORMING FINELY DIVIDED DRY MATERIALS FROM WET MATERIALS HAVING A TENDENCY TO FORM LUMPS

[76] Inventors: Leroy G. Aseltine, 99 Birchwood Dr., Nazareth, Pa. 18064; Gary F. Longenbach, 3231 Farmersville Rd., Bethlehem, Pa. 18017

[21] Appl. No.: 7,727

[22] Filed: Jan. 27, 1987

[51] Int. Cl.[4] .................. C09K 21/00; B02C 13/00; A01J 17/00; A21C 1/00

[52] U.S. Cl. ................... 252/601; 241/185 R; 264/349; 366/83; 366/84; 366/86; 366/88; 366/290; 366/319; 366/155; 425/202; 425/204; 425/205; 425/209

[58] Field of Search .................. 201/33, 36; 202/108, 202/118, 262, 265; 241/185 R, 107, 109; 252/601, 607; 366/35, 81, 38, 83-86, 50, 64-66, 88, 134, 154, 290, 319; 264/349; 425/113, 202, 203, 205, 207, 208, 209, 215, 216, 217, 376 R, 204

[56] References Cited

U.S. PATENT DOCUMENTS

| | | |
|---|---|---|
| 713,859 | 11/1902 | Criswell .................. 23/284 |
| 767,158 | 8/1904 | Leyer ..................... 23/284 |
| 994,991 | 6/1911 | Fernholtz ................ 23/284 |
| 1,015,796 | 1/1912 | Gerlach .................. 23/284 |
| 2,626,856 | 1/1953 | Alles ..................... 23/284 |
| 2,717,825 | 9/1955 | Greenawalt .............. 23/263 |
| 2,735,662 | 2/1956 | Wickland ................ 259/68 |
| 3,418,244 | 12/1968 | St. Louis et al. ......... 252/188.3 |
| 4,134,714 | 1/1979 | Driskill .................. 366/83 |
| 4,156,654 | 5/1979 | Blasius .................. 252/8.1 |
| 4,289,662 | 9/1981 | Blasius .................. 252/607 |
| 4,300,840 | 11/1981 | Kishihiro ............... 366/88 |
| 4,316,873 | 2/1982 | Koch .................... 422/112 |
| 4,329,313 | 5/1982 | Miller et al. ........... 366/88 |
| 4,385,883 | 5/1983 | Hanslik ................. 366/83 |
| 4,400,218 | 8/1983 | Koch .................... 127/1 |
| 4,560,281 | 12/1985 | Harris et al. ........... 366/15 |
| 4,600,311 | 7/1986 | Mourrier et al. ........ 366/88 |

OTHER PUBLICATIONS

Riegel, E. R., PH.d. "Chemical Machinery", Reinhold Publishing Corporation, pp. 251-252.

Primary Examiner—Howard J. Locker
Attorney, Agent, or Firm—O'Keefe & Wilkinson

[57] ABSTRACT

A series of preferably superimposed low inclination troughs containing serial inclined blade rotating mixers and transporters is provided to react dry materials and liquids, and in particular borax with water and acid, in a manner which avoids the formation of refractory lumps and the like. Those are at least two series of rotating blades to both mix and lift the materials into a gas drying stream passing along the troughs. A shearing type grinder or hammer mill is positioned intermediate of the troughs to grind or break up the material part way through the apparatus. Material is discharged from the apparatus in a dry finely comminuted form which does not form lumps upon standing.

16 Claims, 3 Drawing Sheets

APPARATUS AND METHOD FOR FORMING FINELY DIVIDED DRY MATERIALS FROM WET MATERIALS HAVING A TENDENCY TO FORM LUMPS

FIELD OF THE INVENTION

This invention relates to a method and apparatus for treating particulate materials, including drying of such materials, derived from a moist starting material which has a tendency to form lumps either initially or during treatment. More particularly this invention relates to a method and apparatus using a series of troughs with rotary mixing and transport means centered in said troughs to treat said material as it is moved along the troughs by the action of the rotary means. More particularly still, the invention is directed to a method and apparatus for treating material such as boron compounds with acids and the like followed by drying of the materials and wherein the material is treated such that it remains in the finely communited state without forming lumps. The apparatus and method preferably include an apparatus comprised of a series of troughs arranged in a superimposed position one over the other whereby gravity aids passage of material through and/or between the troughs and passage of hot gases through the apparatus is facilitated. The invention is particularly useful in the manufacture of finely divided boric acid type flame retardant material for use in flame proofing of cellulose type insulation material.

DESCRIPTION OF THE PRIOR ART

Many materials either in an initial moist condition or which become moist in a treatment step have a severe tendency to become pasty and form lumps during a subsequent treatment. Such tendency to form lumps is particularly troublesome when the material is drying since tè pasty material tends to become agglomerated into aggregations or accretions which then dry into hard refractory lumps.

One such troublesome material is encountered during the treatment of borax by sulfuric acid to form a boric acid and sodium sulfate product which may be used for fireproofing cellulose materials for use in insulation or the like.

Boric acid, $H_3BO_3$, or $B(OH)_3$, has been known for some years to be very suitable for fireproofing cellulosic and similar materials. Boric acid has been made in the past by various processes, one of the more popular and satisfactory of which has been treatment of borax $NaB_4O_7.5H_2O$, i.e. sodium tetraborate-pentahydrate, with a sulfuric acid solution. In this process the sulfuric acid reacts with the borax to form sodium sulfate and boric acid. The sodium sulfate and boric acid are recovered in solution and the solution is then cooled to precipitate the boric acid in crystalline form. The crystals of boric acid can then be again dissolved and the concentrated solution used to treat cellulose material such as, for example, cellulose made from used newsprint, to make the cellulose material fire resistant and suitable for use in buildings as an insulating material. A number of patents have been issued to various aspects of such process for making boric acid from borax.

More recently, a variant of the borax-sulfuric acid process has become popular in which borax and particularly sodium tetraborate pentahydrate is treated with sulfuric acid in a substantially solid state or only partially dissolved state to form a final combined product comprising both boric acid and sodium sulfate. The combined product is not as effective as boric acid alone in fireproofing cellulosic and similar materials, since the sodium sulfate component has little fire retardant effect. The product as a whole can, however, be brought to about the same efficiency as a boric acid fireproofing material by using more of the product in order to obtain about the same amount of boric acid saturation of the cellulosic materials. Furthermore, since no separation of the boric acid from the sodium sulfate product is necessary, the product is substantially cheaper than refined boric acid and, although more of the product must necessarily be used for a similar amount of fireproofing, an overall saving in material and operating costs results.

One difficulty with the more popular single product borax-sulfuric acid process is the tendency of the borax when treated with sulfuric acid, and, in most cases, also some water, to become pasty and to agglomerate into lumps which upon drying of the product become hard and refractory to comminution and difficult to dissolve when a fire retardant treatment solution is made from the product. A further disadvantage of the prior single product borax-sulfuric acid processes is the fact that since insufficient sulfuric acid and water is used to completely or substantially dissolve the borax material and lumps or particles of borax are necessarily therefore reacted with the sulfuric acid from the outside, a significant central portion of such particles are frequently left unreacted. The larger the particles involved, the more serious is such tendency to leave the inner portions of the product unreacted and the resulting product is of lower quality.

The prior single product process has usually been practiced on a batch, semi-batch or semi-continuous basis in which materials are first mixed with sulfuric acid and then mixed for a time to allow the reaction to continue, following which the material is separately dried.

SUMMARY OF THE INVENTION

The present inventors have discovered that the disadvantages of the prior single product borax sulfuric acid process can e obviated by proceeding in accordance with the present invention in which the borax-sulfuric acid reaction is practiced in a combined reaction and drying apparatus, preferably comprising a series of slightly or moderately inclined troughs in which a rotary type conveying means including mixing and tossing blades or paddles, operates to move the material along the troughs and expose the material to elevated temperature gases particularly in the drying stage. The material is continuously lifted and exposed preferably in a free falling state to the drying gases passing through the apparatus. The materials are also treated at one point in the apparatus by passing through a shearing type hammer mill where rapidly moving blades break up any larger lumps which may have formed in the material during the continuous drying of the outer layers of the small particles. The combined countercurrent exposure to drying gases and continuous lifting of the particles for exposure to the drying gases maintained throughout the apparatus prevents such small particles from becoming pasty and sticking together. In addition, there is no operation which tends to compact the materials even if they become pasty so the formation of lumps is avoided. The blades of the rotary apparatus which aid in moving the material are discontinuous and the material is in effect agitated between the blades so continuous compacting pressure is avoided against any one section of particulates. In addition the slanting arrangement of the troughs in the preferred arrangement of the apparatus decreases the amount of force required to be exerted by the blades to urge the particulates along the troughs. As a result of its novel features and arrangement the method and apparatus of the invention are clean and non-polluting to the atmosphere.

DETAILED DESCRIPTION OF THE INVENTION

The present inventors after close study of prior semi-continuous and batch processes for producing boric acid-sodium sulfate type fire retardant materials were able to recognize certain serious drawbacks of such processes which usually result in an inferior product. Such inferior prior products invariably have both lumps and generally uneven sized particles of product. Such products also invariably have a low boric acid content, or boric oxide equivalent content, and a variable boric acid content, or, in other words, a low and variable reacted material content. One major difficulty with prior processes turned out to be the tendency to develop pasty conditions which causes the formation of lumps and agglomerations unless great care is taken. In some extreme cases the final product has actually had the consistency of a rock. It has been found that it is important to allow the chemical reaction of sulfuric acid with the initial borax particles without developing pasty and compacting conditions which might allow clumping and compaction of the original particles together. If the particles can be prevented from agglomerating and compacting throughout the reaction and subsequent drying, the sulfuric acid soaks uniformly into the particles providing a uniform chemical reaction from the outside and providing a uniform product with a high percentage reaction. The resultant product is thus of very high quality with a uniform percentage of reacted product, i.e. a high and uniform boric acid content, and a uniform small particle size.

The present inventors have discovered that the deficiencies of prior processes and apparatus can be overcome by reacting sulfuric acid and borax with a small amount of water while the particles of borax are being agitated and partially lifted for drying under conditions causing minimum compaction of the particles, i.e. in a trough type reactor while the particles are mechanically urged gently along the trough preferably gently aided by the effects of gravity. The heat of the reaction serves to immediately begin drying of the reaction product and as soon as the reaction is substantially completed, i.e. the sulfuric acid has soaked or progressed to or nearly to the core of the particles, such particles are immediately brought into a drying zone in a continuation of the trough, in which drying zone the particles are gently urged along by rotary paddle or vane means and periodically lifted and allowed to freefall through hot drying gases passing continuously above the body of particulates progressing along the trough. When the particles have progressed through somewhat less than half the drying process the particles are passed through a shearing type hammer mill to break up any small agglomerations of particulates which may have managed to form, after which the particles continue to pass through the drying apparatus while confined in the bottom portion of the trough apparatus and gently urged along the trough by inclined rotating blades and lifted by flat rotating blades for exposure to hot drying gases passing countercurrently through the trough between the top of the body of particulates and the rotary shaft carrying the rotating blades. The product is then discharged from the trough as fine particles of uniform composition product.

Figure 1:
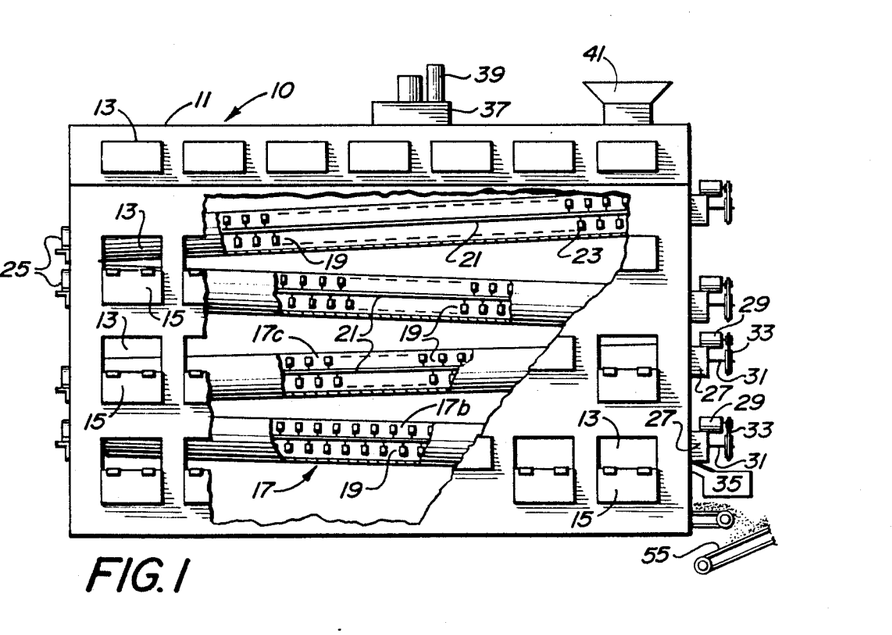
FIG. 1 is a front elevation partially broken away of the apparatus of the invention.

The invention will be more particularly understood from the following detailed description and accompanying drawings in which:

FIG. 1 shows an elevational partially broken away view of the apparatus 10 of the invention. In FIG. 1 there is shown a structural framework 11 which serves as the outer shell of the apparatus 10 of the invention. A series of openings 13 in the structural framework or shell 11 are normally closed by hinged access doors 15. The access doors 15 and openings 11 enable the operators of the apparatus access to the interior of the apparatus for adjustment, repair and monitoring of the apparatus and the process of producing dried flame proofing material in the apparatus. Normally all or most of the access doors 15 will be closed during operation of the apparatus to avoid interferring with the flow of heated gases through the apparatus.

A portion of the front framework of the apparatus of the invention is shown broken away in FIG. 1 in order to reveal a plurality of troughs 17 in the interior of the apparatus. The near side of the troughs 17 are also shown broken away to reveal within the interior of the troughs a series of rotary mixers and screw conveyors 19 which serve to transport the process reactants through the apparatus. The mixers and screw conveyors are each comprised of a shaft 21 upon which are mounted a series of vane type mixing and transport means which as illustrated in the embodiment shown in the drawings may comprise a series of paddles or blades 23. The mixer shafts 21 are journaled at one end in bearings 25 and at the other end in bearings, not shown, contained in gear boxes 27 provided with motors 29 which serve to operate a drive shaft 31 through a belt drive 33. A heater 35 is provided near the bottom of apparatus 10 to discharge hot air into the product discharge end of the lower trough 17d of the apparatus. At the top of the structural framework 11 of the invention there is provided a forced draft apparatus 37 for drawing a continuous stream of hot dry air through the apparatus. Hot air from the apparatus which is drawn out of the top thereof is exhausted through stack 39. The hot air provided by heater 35 may either be forcibly blown into the discharge end of the lower trough 17d by the heater 35, which in such case would have a fan or blower associated with it, or may be drawn from or through the heater by the draught through the apparatus engendered by the forced draft apparatus 37. At the feed end of the apparatus 10 of the invention is a hopper means 41 for feeding the particulate reactants into the apparatus.

Figure 2:
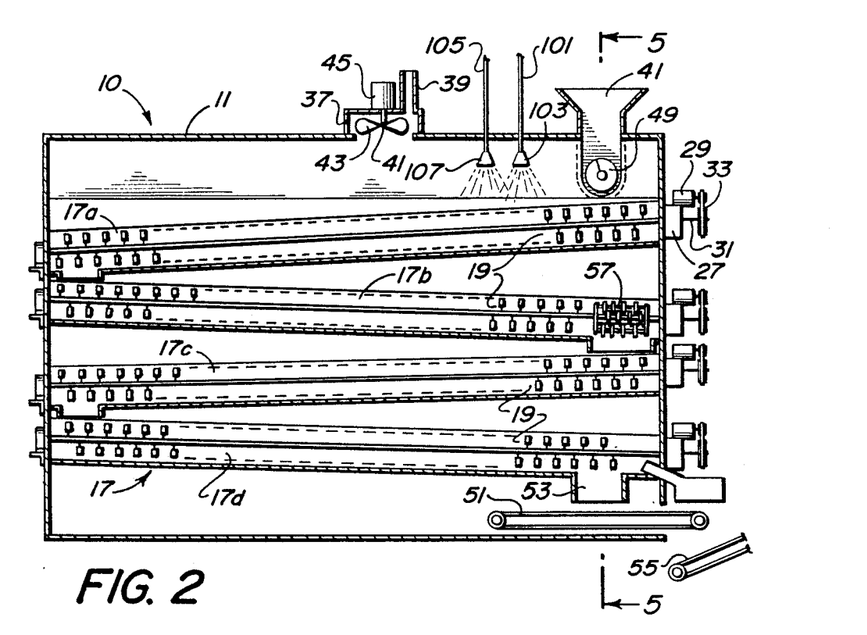
FIG. 2 is a front elevation of the apparatus of the invention with the front structural plates removed.

In FIG. 2 is shown a further elevation of the apparatus of the invention with the front portion of the structural framework 11 removed to reveal the interior of such apparatus. It will be seen that the troughs 17 in the particular embodiment shown are four in number denoted as 17a, 17b, 17c and 17d and extend from one side of the apparatus to the opposite side at a low angle to facilitate movement of particulate materials along the trough as a result of rotation of the mixers and screw conveyors 19 aided by the effects of gravity. It may also be seen that within the forced draft means 37 is a fan 43 operated by a motor 45 through the agency of a shaft 47 to draw hot air through the interior of the apparatus and discharge it through the stack 39. The angle of inclination in the drawings is exaggerated in the drawings for clarity. It is actually preferred for the inclination of the troughs to be about one inch per twenty foot length plus or minus about half an inch, but the troughs may in some cases be inclined as much as four to six inches per twenty foot running length.

The hopper 41 is provided at the bottom with an auger 49 which serves to transport solid feed material from the hopper 41 via the auger 49 into the interior of the apparatus 11 and discharge it into the charging end of the upper trough 17a. At the bottom of the structural framework 11 is a conveyor 51 disposed directly under a discharge opening 53 in the lower trough 17d of the apparatus. Conveyor 51 may be of any suitable type, but as shown may conveniently comprise a belt conveyor. Discharge opening 53 serves to gravity discharge finished dried product material upon the conveyor 51 which conveys such material from the apparatus and drops it onto an inclined conveyor 55 which may then convey the product upwardly and discharge it from the upper end into a truck or other collection means. At the lower end of trough 17b there is mounted a shearing type hammer mill 57. The hammer mill 57 will break larger pieces of product into smaller pieces before discharging them into trough 17c for further drying treatment. Hammer mill 57 is described in greater detail in connection with FIG. 9.

Figure 3:
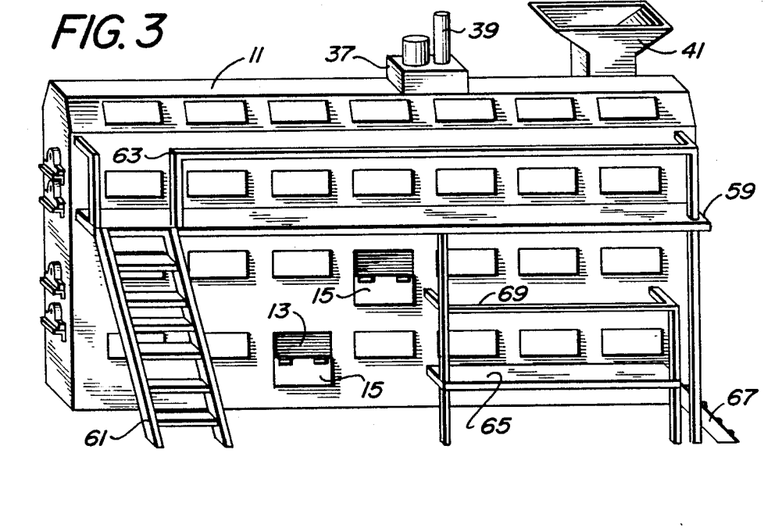
FIG. 3 is a front elevation of the apparatus of the invention showing in particular the acces door arrangement.

In FIG. 3 there is shown an isometric elevation of the facade of the apparatus of the invention including the structural framework 11, the openings 13, access doors 15, forced draft means 37, stack 39 and hopper 41. Also shown are an inspection platform 59 with a stair 61 leading thereto and including railing 63 provided for safety. A lower inspection platform 65 with a stair 67 and platform railings 69 is also shown.

Figures 4, 5:
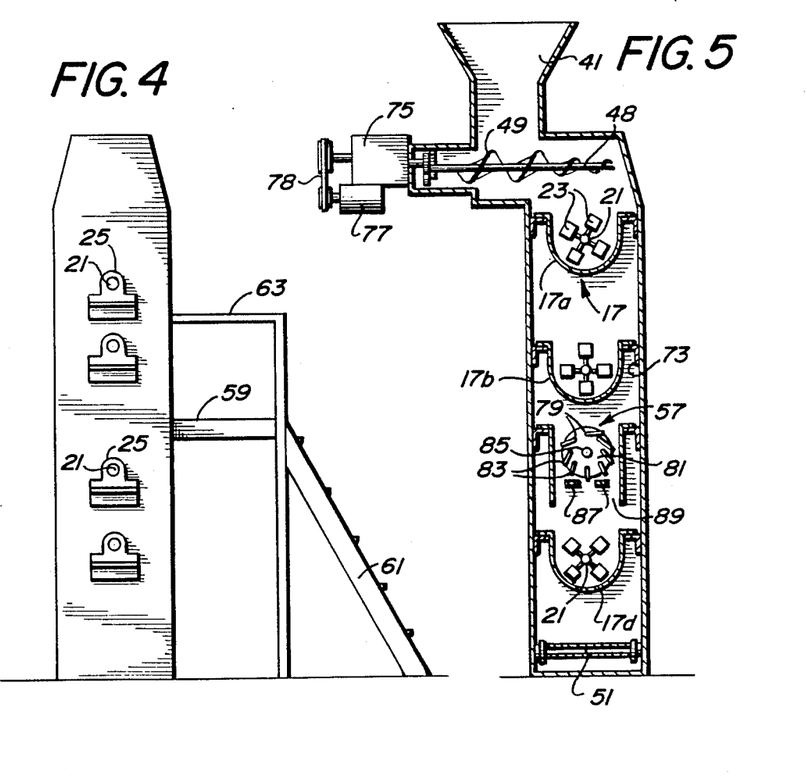
FIG. 4 is an end view of the apparatus of the invention.
FIG. 5 is a sectional view through the apparatus of the invention along section 5—5 of FIG. 2.
Figure 6:
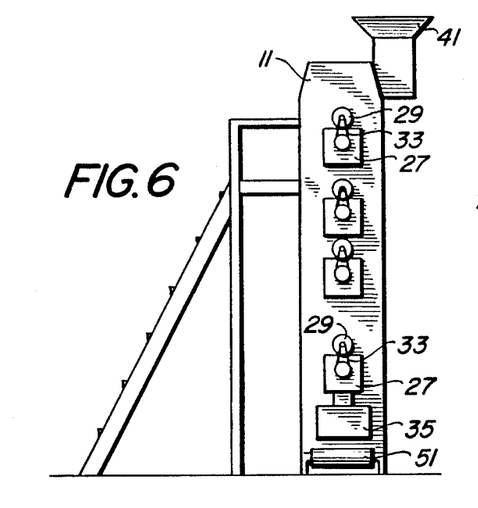
FIG. 6 is an elevational view of the opposite end of the apparatus of the invention from that shown in FIG. 4.

FIG. 4 is an elevational view of the left hand end of the apparatus as seen in FIG. 3. The same reference numbers are used in FIG. 4 as in FIG. 3 to identify the same structures with the addition of the ends of shafts 21 journaled in bearings 25.

FIG. 5 is an elevational view of the apparatus of the invention along section 5—5 of FIG. 2. It may be seen in FIG. 5 that the sides of the troughs 17 fit over bracket supports 73 welded or otherwise attached to the inside of the structural framework 11. It may also be seen that the auger 49 extends from the lower portion of the hopper 41 into the upper portion of the structural apparatus 11 above the upper feed end of upper trough 17a. Shaft 48 of the auger 49 is mounted in a gear box 75 and operated with the motor 77 through belt drive 78. The hammer mill 57 is shown in FIG. 5 as comprising a series of shafts 79 mounted in circular plates 81. A series of swinging breaker knives or hammers 83 are shown freely journaled on the shafts 79 so that as the plates 81 rotate on the central shaft 85 the swinging blades impact against breaker bar 87 adjacent to discharge opening 89. It has been found that it is important that no functional wire mesh screen or the like be mounted in the opening 89 to retain oversize particles of product since the consistency of the product at this point will cause adherence to any such screen and quickly cause clumping and blockage. The sheared or ground product is therefore discharged directly into the next stage of drying, the process being such that little oversize material passes through the shearing grinder and any that does has no significant detrimental effect. The central shaft 85 of the hammer mill is driven through a gear box 93 upon which is mounted a motor 95 which drives the gear box shaft 97 through a belt drive 99. See more particularly FIG. 9.

Figure 7:
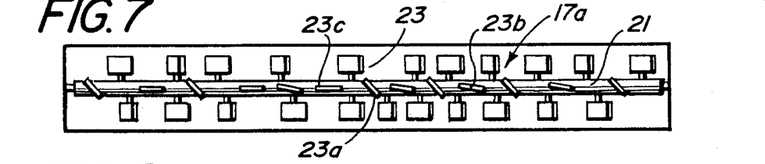
FIG. 7 is a plan view of the upper trough and rotary mixing means in the apparatus of the invention.

FIG. 7 is a plan view of the first or upper trough 17a showing the mixer shaft 21 and paddles or blades 23. In the first portion of the trough the paddles or blades 23 are disposed at two angles, an angle of 45 degrees with the axis of the shaft and 70 degrees with the axis of the shaft. The angles of the paddles or blades of the first or reaction portion of the trough are substantially alternated between those paddles 23a which are disposed at 45 degree angle and those paddles 23b which are disposed at an angle of 70 degrees with respect to the axis of the shaft. In the second or drying portion of the troughs the majority of the paddles are arranged at 45 degrees with respect to the axis of the shaft and only a few spaced paddles 23c are disposed parallel to the axis of the shaft interspersed among the 45 degree angle paddles. It has been found that about five parallel paddles or blades interspersed among the remainder of the 45 degree angled vane means is very satisfactory.

Figure 8:
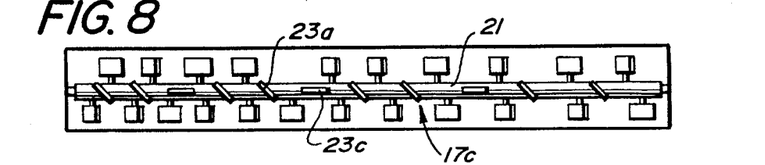
FIG. 8 is a plan view of the rotary mixing means of the third trough together with the rotary mixing apparatus of said trough.

FIG. 8 is a plan view of trough 17c, the third trough from the top of the apparatus of the invention. It will be seen in FIG. 8 that the majority of the paddles 23a are disposed at an angle of 45 degrees with the axis of the mixer shaft 21 and only a few of the paddles are disposed at other than 45 degrees, i.e. at 0 degrees or parallel to the axis of the shaft. Normally there will be about five of the parallel paddles 23c in the trough. The parallel paddles 23c serve to lift the product from within the trough and pass it through the hot dry gases being drawn through the apparatus of the invention. They also effectively slow down the transport of the material through the apparatus without decreasing the continuous mixing of the material and allowing it to clump. As the parallel paddles or blades rotate about the axis of the mixer shaft with the rotating shaft, the paddles dip into the body of particulates and lift a portion of the particulates from the body of particulates into the hot gases. As the paddle moves through the gases a stream or thin curtain of particulates normally falls continuously from the sides of the paddle and through the hot gases until the paddle assumes an angle sufficiently close to vertical for all of the particulates to slide from the paddle.

While it has been found that for use in reacting borax with sulfuric acid to provide a boric acid-sodium sulfate product it is very satisfactory to dispose the paddles or vanes at the feed end of the upper trough at respective angles of 45 degrees and 70 degrees respectively with a plane taken through the axis of the rotary mixing shaft, a range of angles may be satisfactorily used. With borax and like particulates it is possible to position the angle of the mixing paddles or blades within a range of plus or minus about ten degrees respectively from 45 degrees and 70 degrees and it is preferable to position the blades within a range of plus or minus 5 degrees from such respective angles in the initial portion of the feed or reaction section of the apparatus. It may be desirable to have the blade angles adjustable in order to allow the angles to be adjusted to either retard or accelerate movement of the material along the trough. Adjustment can be readily effected if the blades are secured to threaded rod or bolt means which is passed through the rotating shafts 21 and secured with a jam or lock nut on the opposite side. Other adjustment means can also be used.

With respect to the blades in the remaining drying portions of the apparatus the 45 degree angle of the blades responsible for moving or urging the particulates along the troughs can have an angle of plus or minus 10 degrees or preferably plus or minus five degrees from the most preferred angle of 45 degrees. However, the blades 23c disposed at 0 degrees or parallel with the axis of the rotary shaft or in most cases constituting a portion of a plane through or parallel with the axis of rotation is preferably maintained within a few degrees of 0 degrees or at most is not disposed at an angle greater than the angle of repose of the material being processed. If an angle greater than the angle of repose is exceeded as the blade passes from the accumulation or body of particulates in the bottom of the trough, the particulates would slide off the blade instead of being carried upwardly with the blade. If the blade is at an angle of 0 degrees or within a few degrees thereof such as 5 or 6 degrees, or at least not at an angle greater than the angle of repose, the particulates are carried up with a blade and only progressively slide off the blade as it is gradually tipped upward with the progressive rotation of the mixing shaft.

It is important that the depth of particulates in the troughs not be too great so that the mixing and lengthwise motion imparting blades only dip into the body of particulates during a portion of their traverse about the mixing shaft. If the blades or paddles remained too long in the body of particulates, the adjacent portions of the body of particulates would be too greatly compacted and sticking and adherence together of the particle would be encouraged. It is preferable, therefor, for the quantity of particulates not to exceed that which will when evenly distributed fill approximately 10 to 15% of the trough. However, the trough may less preferably be maintained at from 20 to 25% or at the most from 30 to 35% full of particulates. It will be recognized that in order to maintain the correct filling of the trough it is necessary to coordinate the feed of particulates and the rotational speed and angle of the mixing blades.

It is very important that the material reach the shearing grinder or hammer mill sufficiently dried effectively throughout the particles so that the grinding itself does not cause the particles to become wet, since water is released from the material by the very act of grinding and will then in itself cause clumping and lumps. In this regard, therefore, it is desirable for the blades to be adjustable so the traverse of the material through the apparatus can be slowed down if necessary without decreasing the rotational speed of the rotating blades, since continuous mixing is also necessary if clumping is to be avoided. The rotating blades preferably rotate at 50 to 60 r.p.m., but less preferably could rotate at from approximately 40 to 75 r.p.m.

Figure 10:
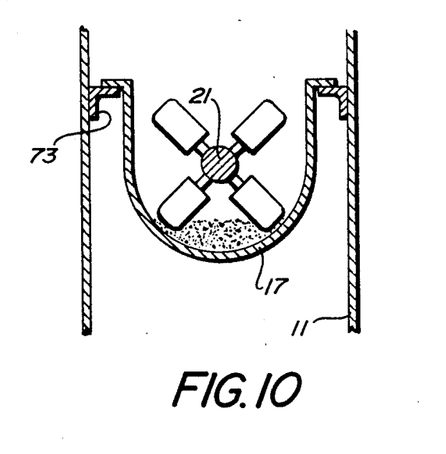
FIG. 10 is an enlarged end elevation of one of the troughs of the invention showing the particulates urged along the bottom of the trough by the blades of the rotary mixing means.

The rotary shafts 21 upon which the mixing and lengthwise motion imparting blades are mounted are preferably mounted substantially parallel with the top of the troughs 17, but can be mounted lower or higher depending upon the depth of material which is to be treated and the design of the trough. If the shaft is too high above the particulate body, the flat blades will not be able to conveniently raise very much particulate above the body of particulate without being very closely spaced to the walls of the trough. The relationship of the level of the particulates and the rotary blades within the trough is shown in FIG. 10.

In operation of the apparatus in accordance with the method of the invention, borax and preferably borax 5, i.e. the pentahydrate of sodium tetraborate, is placed in the hopper 41 and introduced into the structural framework 11 through one wall thereof by the auger 49 which drops or deposits the borax into the trough 17a where it is urged along the trough by the movement of blades 23a and 23b. Water is introduced into the apparatus through a line 101 and spray head or more preferably a water bar 103 and sulfuric acid is likewise introduced into the apparatus through a line 105 and a spray head or acid bar 107. The water bar is preferably fairly wide and may extend about eighteen inches, plus or minus two or three inches, in the direction of travel of the material in the troughs. The water drips gently from orifices in the water bar onto the material in the trough while such material is being continuously mixed and thoroughy moistens or soaks the particulates of borax, preferably to the general consistency of oatmeal or a wet sand, prior to application of the acid.

The acid is also applied to the moistened borax by an acid bar 107 which is preferably about 20 inches wide in the direction of travel, with the same general tolerance as the water bar. The acid bar has larger orifices to accommodate the greater viscosity of the acid. The already thoroughly mixed and moistened condition of the borax material plus its continued mixing allows the reaction of the acid with the particulates at a very rapid rate substantially throughout the particulates. Temperatures in excess of 250 degrees F. will be rapidly attained causing the particulates to be essentially surface dry within a few inches of passage from beneath the acid bar and the reaction between the acid and the borax to be essentially complete at least on the surface.

The 70 degree angle blades or paddles 23b pick up the product and mix it with water and acid as it is conveyed along the troughs by the action of the 45 degree angled blades 23a. The motor 29 for the paddle mixer shaft 21 of first trough 17a will have a higher horsepower, e.g. five horsepower, to accmmodate the somewhat greater viscosity conditions of the product after it is mixed with water and acid. The motors 29 of the drying troughs may have a lower horsepower, e.g. about three horsepower. The reaction of the acid with the borax as indicated produces heat which is then carried along with the product by the action of the transporting paddles 23a, i.e. the 45 degree angle paddles. The 70 degree angle paddles also have a tendency to move the mass of material along the trough as well as mix and expose it to the hot gases flowing through the trough from the reaction. As the materials reach the central portion of the trough they are met by the hot gases or air passing to the exhaust 37.

As the mass of materials nears the end of the trough 17a it drops through a discharge orifice in the trough into the second trough 17b. The second trough 17b has within it a rotary mixing shaft having a series of paddles or blades similar to those shown in FIG. 8 for a trough 17c. These paddles or blades are predominantly arranged at 45 degree angles and are interspaced at intervals with paddles arranged parallel to the axis of the shaft. As the material is carried along the shaft by action of the rotating paddles it is lifted by the flat paddles which carry it through the hot gases which are passing up through the troughs from the bottom of the apparatus. The particulate materials are therefore at the same time both moved along the trough, and picked up and exposed to the hot gases, thus drying the material.

Figure 9:
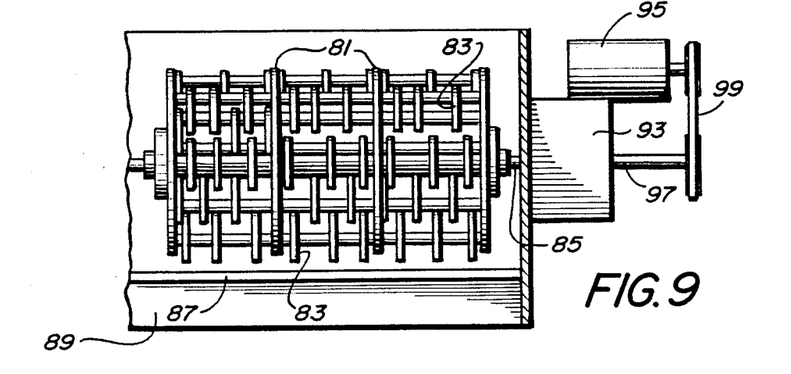
FIG. 9 is a plan view of the shearing hammer mill apparatus of the invention.

At the lower end of the trough 17b there is arranged a hammer mill shown in more detail in FIG. 9. On the hammer mill a series of narrow blades, preferably about 72 separate blades, are pivotally mounted to swing on preferably eight shafts, which are in turn mounted about the periphery of the series of circular plates extending from the shaft of the hammer mill. The individual shafts 79 in the hammer mill are provided with washers between the knives to maintain the proper spacing of the hammer mill knives 83. Each of the knives 83 impinges during the rotation of the hammer mill apparatus upon a breaker bar 87 positioned adjacent to a discharge opening 89. No wire mesh screen or the like is used in the discharge opening.

From the hammer mill 57 the material passes into the third trough 17c, the arrangement of the paddles or blades of which is shown in more detail in FIG. 8. From the trough 17c the material drops into trough 17d and finally at the end of trough 17d is discharged through the bottom of the trough onto the conveyor belt 51 which moves continuously and discharges material onto an inclined conveyor belt 55 for lifting and dropping it into a truck or other suitable container or conveyance, not shown. During the entire operation of the apparatus the hot air heater 35 heats air and blows a blast of heated air into the end of trough 17d to dry the product. The hot air injected by the hot air heater 35 passes up to the plurality of troughs of the invention and is exhausted by the forced draft apparatus 37 at the top of the apparatus. The heated air or gases exhausted from the forced draft apparatus 37 at the top of the apparatus is clean and non-polluting as the result of two factors (a) the air passess progressively and countercurrently from a dryer into a more moist environment so that any small particles of dry or dust like materials which may be entrained in the gas stream from the drying sections or the hammer mill tend to be removed from the gases as they are deviated in their path by the protruding paddles and blades of the rotary mixing apparatus in a progressively more moist environment, (b) a somewhat less than molar amount of sulfuric acid is used so that all the available sulfuric acid is used up in soaking into and reacting with the borax in the particles of borax and non is left over to escape from the apparatus as a sulfuric acid mist.

By operating in accordance with the present invention, it has been found that a dry fire retardant product of high quality, i.e. having a high percentage of boric acid therein, is produced. Such product is of higher quality and more uniform size than could be produced by prior art apparatus and processes.

As indicated above it has been found to be important to quickly react the acid with thoroughly moistened borax particulates and then after the heat of the reaction dries at least the surface of the particulates maintain them continuously mixing and additionally drying by heated gas passing through the apparatus until the particulates are passed from the end of the apparatus as a dry non-lumping product. It has also been found to be critical that the particulates reach the shearing grinder or hammer mill in a dry condition such that the grinding, which in itself releases moisture, does not create a slurry or near slurry. This must be effected without, as happens in a batch type process, excess drying of the surface of the product, which in itself would retard its fire retardant properties due to loss of some of its chemically combined water. Operation in accordance with the invention enables not only the production of a very effecive high ratio of boric acid in the product, but a non-lumping product which requires no further processing prior to addition as a fire retardant during the manufacture, for example, of cellulose insulation material, or other application as a fire retardant material.

In an example of the use of the apparatus and process of the invention, borax 5, or so-called 5 mol borax, i.e. sodium tetraborate, pentahydrate, in an amount of approximately 90 pounds per minute was passed through the apparatus of the invention. The borax material was initially mixed with 1.6 gal./min. of water applied through water bar 103 and thoroughly mixed by the angled blades until the consistency was approximately that of cooked oatmeal or a wet sand. Two (2) gal./min. of 98% 66 Baum A technical grade sulfuric acid was then added through acid bar 107 and the three reactants mixed together by rotation of the shafts 21 and blades 23 at approximately 55 rpm. The heat of reaction reached approximately 250 degrees fahrenheit. The heat of reaction caused the surface of the particulates to be dry within a few inches after completion of the addition of the acid. Beyond the borax-sulfuric acid reaction zone the reaction product continued to dry as it was exposed to hot dry air passing along the troughs from the heater 35. The hot dry air was maintained at an initial temperature of 125 degrees. The particulate reaction product comprised small particles of boric acid and sodium sulfate on the outside and unreacted borax on the inside. A large percentage of the borax charged was reacted to form a boric acid product having a 60 to 69% boric acid equivalency, a very high percentage for this type of product. The product had the general size and consistency of a mixture of powdered and granulated sugar.

It will be understood that while the invention has been described with considerable specificity and disclosed in terms of embodiments or modifications which it has assumed in practice, the scope of the invention should not be deemed to be so limited and it is to be construed broadly within the bounds of the appended claims. Other embodiments of the invention in addition to those shown and described may be successfully made or practiced and the invention may be applied to the treatment of other materials than those particuarly described with or without modifications.

We claim:

1. An apparatus for making a substantially dry finely divided reaction product from granular and liquid reactants which tend to form pasty and/or lumpy reaction products comprising:
   (a) a first trough means having an initial reaction zone at one end and a discharge zone at the opposite end with a rotary conveying means extending along the trough from the reaction zone to the discharge zone,
   (b) a rotary blade fracturing means receiving the discharge from the first trough means on a first side and discharging on a second side,
   (c) a second trough means receiving the discharge from the rotary blade fracturing means said trough means being provided with a rotary conveying means extending therethrough from the discharge of the rotary blade fracturing means to a discharge from the trough,
   (d) forced draft means for drawing heated gas through the second and first trough means to dry the material within the troughs,
   (e) first substantially angled blade means on the rotary conveying means to urge the reaction product along the trough means, comprising a plurality of separate blade means angled with respect to the longitudinal axis of the rotary conveying means at an inclination of 35 to 55 degrss,
   (f) second flat blade means to lift material from the trough and carry it through the heated gas draft in the first and second trough means comprising a plurality of separate blades disposed with respect to the longitudinal axis of the rotary conveyor means at from 0 degrees to not more than the angle of respose of the material in a dry state for which the apparatus is designed, said blades being disposed in substantially all the trough zones except the initial reaction zone,
   (g) third angled blade means comprising a plurality of separate blade means within the initial reaction zone disposed with respect to the longitudinal axis of the rotary conveyor at an inclination of from 60 to 80 degrees, and
   (h) the first angled blade means and the second flat blade means being interspersed between each other along the rotary conveying means in the trough means except in the reaction zone of the first trough means where the first angled blade means and the third angled blade means are interspersed.

2. Apparatus in accordance with claim 1 wherein the first and second trough means are vertically superimposed with the second trough means on the bottom.

3. Apparatus in accordance with claim 2 wherein the first trough means and second trough means are each comprised of two separate superimposed troughs feeding in different directions with the top trough discharging into the lower trough.

4. Apparatus in accordance with claim 1 adapted for producing a boric acid product wherein borax, water and sulfuric acid are fed into the feed end of the first trough means in a closely spaced portion of the rotary conveyor means.

5. An apparatus according to claim 1 wherein the angles of the blades are respectively 40 to 50 degrees and 65 to 75 degrees in the initial reaction zone and 40 to 50 degrees and +3 to −3 degrees in the remainder of the trough sections.

6. A method of producing a boric acid type fire retardant material comprising:
   (a) discharging borax, water and sulfuric acid in that order into a reactant zone of a trough slightly inclined at an angle of from one half to 5 inches in twenty feet from horizontal and conveying the said reactants along said trough by rotating blade means aided by gravity, the blade means having an angle of about 35 to 55 degrees with respect to the axis of the shaft upon which said blades are mounted,
   (b) meanwhile lifting the reactants and resulting moist reacted product into contact with the atmosphere over the body of reactants and product and partially conveying said reactants and product by means of blades having an angle of 60 to 80 degrees with the axis of the shaft upon which said blades are mounted,
   (c) the moist reacted product of said reactants plus any unreacted reactants being conveyed into a drying zone where they are, in order to effect drying of such rected and nonreacted materials lifted periodically into countercurrently flowing hot gases by blades having an angle not greater than the angle of repose of the material being dried and where said product and any unreacted reactants continue to be conveyed along troughs by 35 to 55 degree angled blades,
   (d) and intermediately of adjacent superposed sections of troughs containing the 35 to 55 degree inclined blades and blades having an angle not greater than the angle of repose of said materials being dried passing said product materials into a shearing type hammer mill where oversize particles are reduced in size,
   (e) the relative feed and discharge from the apparatus and rate of rotation of the rotating mixing and conveying means being such as to maintain a body of reactants and reacted products in the bottom of the troughs having a depth of about 10 to 35 percent of the depth of the trough from the bottom thereof to the axis of the shaft upon which the blades are mounted.

7. A method in accordance with claim 6 wherein the depth of the body of reactants and reacted products is maintained at a depth of from 20 to 25 percent of the depth of the trough.

8. A method in accordance with claim 6 in which the blades having an angle of repose of less than the angle of repose of the material being dried are angled at from plus 5 to minus 5 degrees with the axis of the rotating shaft upon which they are mounted.

9. A method in accordance with claim 6 wherein the inclination of the trough is one half to one and a half inches in twenty feet.

10. A method of producing boric acid type fire retardant material comprising:
    (a) applying sufficient water to particulates of borax pentahydrate while continuously mixing said particulates to thoroughly moisten said particulates and bring them to a barely wet consistency,
    (b) immediately applying somewhat less sulfuric acid than is necessary to completely react with the borax to said particulates while continuously mixing said particulates with angled blades to prevent compaction, (c) continuing to mix said particulates with angled blades while moving them along a passage through which hot gases are passing countercurrently, (d) at intervals lifting said particulates from the general body of particulates with blades angled with respect to a rotating shaft upon which they are mounted less than the angle of repose of said particulates into said gas stream and allowing the particulates to fall from said blades through the gas stream, (e) passing the continuously mixed dried particulates through a grinding operation in a sufficiently dry condition so grinding does not significantly moisten them, and (f) further drying and mixing the ground particulates until prior to discharging as a non-lumping particulate product.

11. The method of claim 10 wherein angled blades are given a rotary motion in the range of 40 to 70 revolutions per minute.

12. The method of claim 11 wherein the rotation is at a rate of 50 to 60 revolutions per minute.

13. The method of claim 12 wherein the particulates are maintained in an elongated slightly inclined bed and are moved along the bed by the inclined blades which are arranged to pass through said bed only in the lower quadrant of their rotary travel.

14. An apparatus for making a substantially dry finely divided reaction product from granular and liquid reactants which tend to form pasty and/or lump reaction products comprising:

(a) a first trough means having a reaction zone at one end and a discharge zone at the opposite end with a rotary conveying means extending along the trough from the reaction zone to the discharge zone, (b) a rotary blade fracturing means receiving the discharge from the first trough means, (c) a second trough means with a rotary conveying means extending therethrough from the discharge of the rotary blade fracturing means to a discharge from the trough, (d) forced draft means for drawing heated gas through the second and first trough means to dry the material within the troughs, (e) first substantially angled separate blade means on the rotary conveying means to urge the reaction product along the first and second trough means, (f) second substantially unangled separate blade means on the rotary conveying means to lift the reaction product periodically from a bed of material in the trough and carry it through the heated gas passing through the machine, (g) third partially angled separate blade means on the rotary conveying means in the initial reaction zone, (h) the first substantially angled blade means being mounted upon the rotary conveying means at an angle calculated to move the finely divided reaction product along without severely compacting it or causing the finely divided reaction product to form lumps so long as the outer surface of the finely divided material at least is substantially dry, (i) the second substantially unangled blade means being mounted upon the rotary conveying means at an angle within the angle of repose of substantially dry particulates of the type to be treated in the drying sections of the apparatus, said second unangled blades being arranged and constructed in conjunction with the rotary conveying means to lift dried and drying particulates from a bed of particulates in the second portion of the first trough means and the second trough means to expose said particulates to heated gas passing through the troughs, (j) the third partially angled blade means in the initial reaction zone of the first trough means being inclined at an angle between that of the first substantially angled blade means and the second substantially unangled blade means and being calculated to lift and mix the reacting particulates and at the same time aid in moving said particulates gently along, and (k) the first angled blade means and the second substantially unangled blade means being interspersed between each other along the rotary conveying means in the second portion of the first trough means and in the second trough means and the first angled blade means and third partially angled blade means being interspersed between each other in the initial reaction zone of the first trough means.

15. An apparatus in accordance with claim 14 wherein the third partially angled blade means have an inclination with respect to the longitudinal axis of said rotary conveyor means of +6 to −6 degrees.

16. An apparatus in accordance with claim 15 wherein there are a plurality of trough means mounted in vertical succession each trough means being inclined at least slightly in the direction of movement of the material to be moved by the rotary conveyor means, the blade means on the rotary conveyor means in the majority of the trough means being arranged similarly to those in the second trough means.

* * * * *